(12) United States Patent
Liu et al.

(10) Patent No.: US 12,041,334 B2
(45) Date of Patent: Jul. 16, 2024

(54) CAMERA ASSEMBLY AND DISPLAY DEVICE HAVING THE SAME

(71) Applicant: Qisda Corporation, Taoyuan (TW)

(72) Inventors: Hung-Hsun Liu, Taoyuan (TW); Yi-Ching Lin, Taoyuan (TW); Feng-Yu Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/680,458

(22) Filed: Feb. 25, 2022

(65) Prior Publication Data

US 2023/0141544 A1 May 11, 2023

(30) Foreign Application Priority Data

Nov. 11, 2021 (TW) ................................ 110142085

(51) Int. Cl.
*H04N 23/57* (2023.01)
*H04N 7/14* (2006.01)
*H04N 23/51* (2023.01)

(52) U.S. Cl.
CPC ............. *H04N 23/57* (2023.01); *H04N 23/51* (2023.01); *H04N 7/142* (2013.01)

(58) Field of Classification Search
CPC ..................................................... H04N 7/142
USPC .................................................... 348/207.99
See application file for complete search history.

(56) References Cited

U.S. PATENT DOCUMENTS

| | | | | |
|---|---|---|---|---|
| 10,999,518 B1* | 5/2021 | Lavallo | ................... | H04N 23/51 |
| 11,150,690 B2* | 10/2021 | Franke | ................... | G06F 1/1607 |
| 11,470,191 B2* | 10/2022 | Choi | ................... | G02B 7/023 |
| 2014/0240219 A1* | 8/2014 | Kim | ................... | G06F 3/005 |
| | | | | 345/156 |
| 2016/0352990 A1* | 12/2016 | Cho | ................... | H04N 21/4223 |
| 2020/0177715 A1* | 6/2020 | Chen | ................... | F16M 11/105 |
| 2020/0281083 A1* | 9/2020 | Tang | ................... | G06F 1/1686 |
| 2022/0006934 A1* | 1/2022 | Tan | ................... | H04M 1/0264 |
| 2023/0127461 A1* | 4/2023 | Goh | ................... | G03B 17/561 |
| | | | | 348/373 |

FOREIGN PATENT DOCUMENTS

| | | | | |
|---|---|---|---|---|
| CN | 209105283 U | | 7/2019 | |
| CN | 211479011 U | | 9/2020 | |
| CN | 110602366 B | * | 7/2021 | ........... H04N 5/2251 |
| CN | 213780787 U | | 7/2021 | |

(Continued)

OTHER PUBLICATIONS

Office action of counterpart application by Taiwan IP Office on Jun. 8, 2022.

*Primary Examiner* — Anthony J Daniels

(57) ABSTRACT

A camera assembly adaptable to a display device is provided. The camera assembly comprises a fixed base, a lifting component, an elastic element and a camera module. The fixed base is disposed in the display device and fixed with the display device. The lifting component is movably connected to the fixed base. The elastic element is connected with the lifting component and the fixed base respectively. The camera module is pivotally connected to the lifting component. The elastic element provides elastic force to drive the lifting component to raise the camera module so that the camera module is exposed from the display device, and the camera module pivots relative to the lifting component to tilt the display device.

14 Claims, 10 Drawing Sheets

(56) References Cited

FOREIGN PATENT DOCUMENTS

| | | | | |
|---|---|---|---|---|
| CN | 113497870 A | 10/2021 | | |
| EP | 2683159 A2 * | 1/2014 | ............. | G06F 3/167 |
| WO | WO-2020027775 A1 * | 2/2020 | ........... | G06F 1/1605 |

* cited by examiner

CAMERA ASSEMBLY AND DISPLAY DEVICE HAVING THE SAME

This application claims the benefit of Taiwan application Serial No. 110142085, filed on Nov. 11, 2021, the subject matter of which is incorporated herein by reference.

BACKGROUND OF THE INVENTION

Field of the Invention

The invention relates in general to a camera assembly and a display device having the same.

Description of the Related Art

Nowadays, desktop computer normally uses an externally installed lens to implement video conference or other applications where video function is required. If the required video lens module can be integrated with the display of a desktop computer, the user will be provided with greater convenience of use. Therefore, it has become a prominent task for the industries to provide a video lens which is built in the display of a desktop computer and is convenient for the user to operate.

SUMMARY OF THE INVENTION

According to one embodiment of the present invention, a camera assembly adaptable to a display device is provided. The camera assembly includes a fixed base, a lifting component, an elastic element and a camera module. The fixed base is disposed in the display device and fixed with the display device. The lifting component is movably connected with the fixed base. The elastic element is connected with the lifting component and the fixed base, respectively. The camera module is pivotally connected with the lifting component. The elastic element provides an elastic force to drive the lifting component to raise the camera module, so that the camera module is exposed from the display device and pivotally rotated with respect to the lifting component and tilts to the display device.

According to another embodiment of the present invention, a display device is provided. The display device includes a body and a camera assembly. The camera assembly includes a fixed base, a lifting component, an elastic element and a camera module. The fixed base is disposed in the body and fixed with the body. The lifting component is movably connected with the fixed base. The elastic element is connected with the lifting component and the fixed base, respectively. The camera module is pivotally connected with the lifting component. The elastic element provides an elastic force to drive the lifting component to raise the camera module, so that the camera module is exposed from the body and pivotally rotated with respect to the lifting component and tilts to the body.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
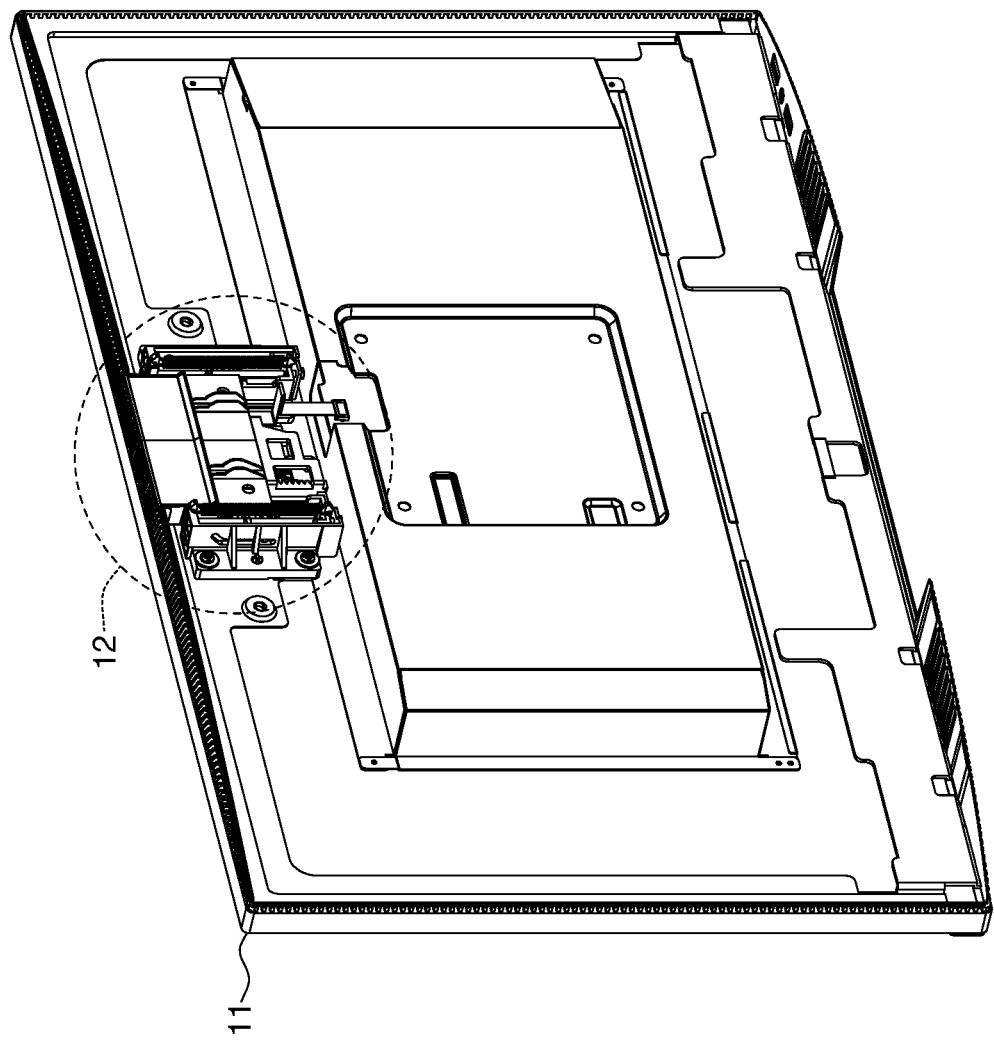
FIGS. 1 to 2 are stereoscopic views of a display device according to an embodiment of the present invention.
Figure 2:
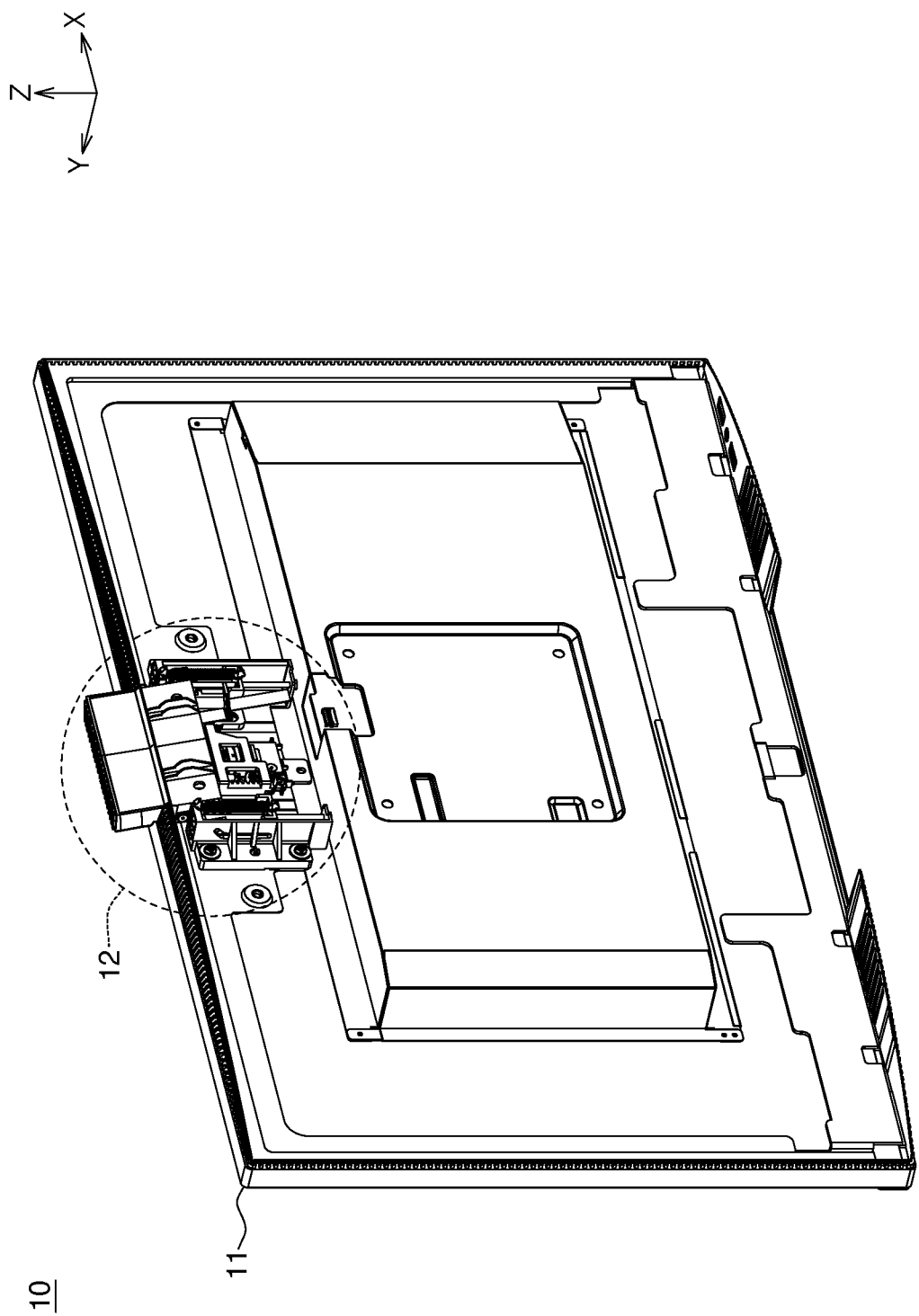
Figure 3:
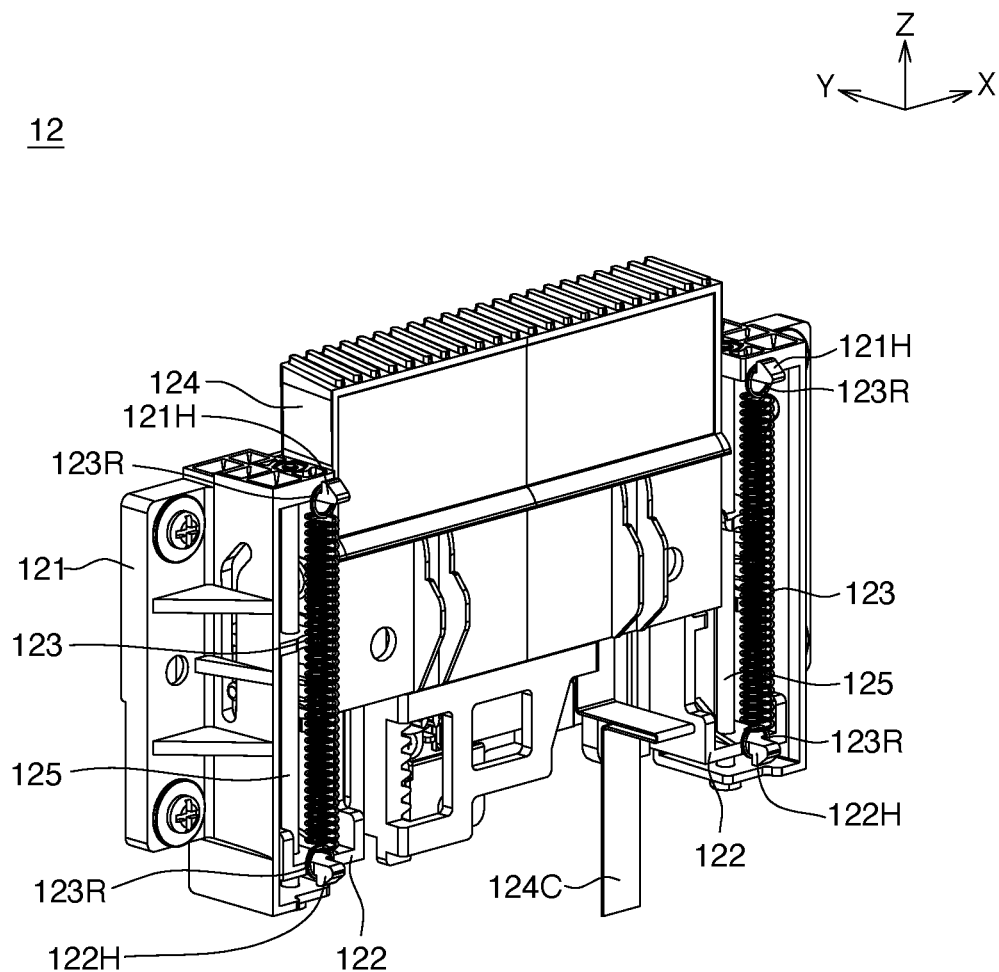
FIGS. 3 to 4 are stereoscopic views of a camera assembly of a display device according to an embodiment of the present invention.
Figure 4:
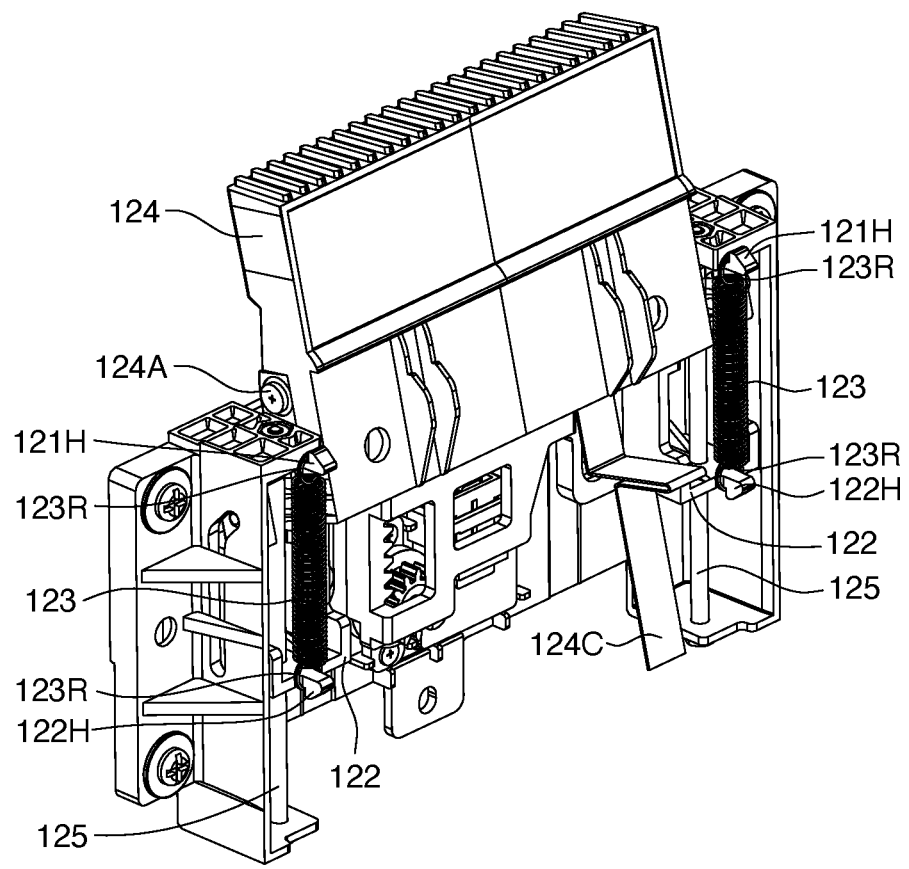

Refer to FIGS. 1 to 4. FIGS. 1 to 2 are stereoscopic views of a display device 10 according to an embodiment of the present invention. FIGS. 3 to 4 are stereoscopic views of a camera assembly 12 of a display device 10 according to an embodiment of the present invention.

The display device 10 of the present invention includes a body 11 and a camera assembly 12. As indicated in FIG. 1, the camera assembly 12 is adaptable to the display device 10, the top surface of the camera assembly 12 flushes with the top surface of the body 11, and the camera assembly 12, when not in use, can be concealed inside the body 11 of the display device 10. As indicated in FIG. 2, the camera assembly 12, when in use, can pop up and rotate by an angle, so that the lens angle of the camera assembly 12 can tilt downward to include the user. It should be noted that in FIGS. 1 to 2, the structure of the camera assembly 12 is illustrated but the rear casing of the body 11 is omitted. It should be understood that the camera assembly 12 can be covered by the rear casing of the body 11 to be concealed inside the body 11.

As indicated in FIGS. 3 to 4, the camera assembly 12 includes a fixed base 121, a lifting component 122, an elastic element 123 and a camera module 124. As indicated in FIGS. 1 to 2, the fixed base 121 is disposed in the display device 10 and fixed with the body 11 of the display device 10. For example, the fixed base 121 may be fixed on the body 11 by way of screwing or riveting but is not limited thereto. As indicated in FIGS. 3 to 4, the lifting component 122 is movably connected with the fixed base 121 to change the position of the camera module 124 along the Z-axis direction. The elastic element is connected with the lifting component 122 and the fixed base 121123, respectively. Specifically, the elastic element 123 can be realized by an extension spring, and each end of the elastic element 123 has a ring structure 123R. The two ring structures 123R are hooked on the hook structure 121H of the fixed base 121 and the hook structure 122H of the lifting component 122, respectively.

The camera module 124, which can be realized by a module of a webcam, is pivotally connected with the lifting component 122. Specifically, as indicated in FIG. 4, each of the two sides of the camera module 124 has a pivot 124A connected with the lifting component 122. The pivot 124A allows the camera module 124 to rotate around the X-axis with respect to the lifting component 122 but the camera module 124 is only allowed to be translated along the X-axis direction. In an embodiment, the pivot 124A can be realized a shaft passing through the two sides of the camera module 124. Besides, the camera module 124 includes a signal wire 124C, through which the camera module 124 is connected with the display device 10 to implement videotaping/video functions. As indicated in FIGS. 3 to 4, the middle part of the signal wire 124C can have a foldable configuration to avoid the wire being pulled or stretched during the upward and downward movement of the camera module 124.

When the user wants to use the built-in videotaping/video functions of the display device 10, the user can press the top surface of the camera module 124 to trigger the pop-up of the camera module 124. Meanwhile, the elastic element 123 is deformed and provides an elastic force to drive the lifting component 122 to raise the camera module 124, so that the camera module 124 as indicated in FIG. 2 is exposed from the body 11 of the display device 10, and the camera module 124 is pivotally rotated with respect to the lifting component 122 and tilts to the body 11 of the display device 10 as indicated in FIG. 2. Illustratively but not restrictively, the camera module 124 can tilt to the body 11 of the display device 10 at an acute angle. Furthermore, the camera module 124 can tilt to the body 11 of the display device 10 at an angle of 10 to 15°.

Figure 5:
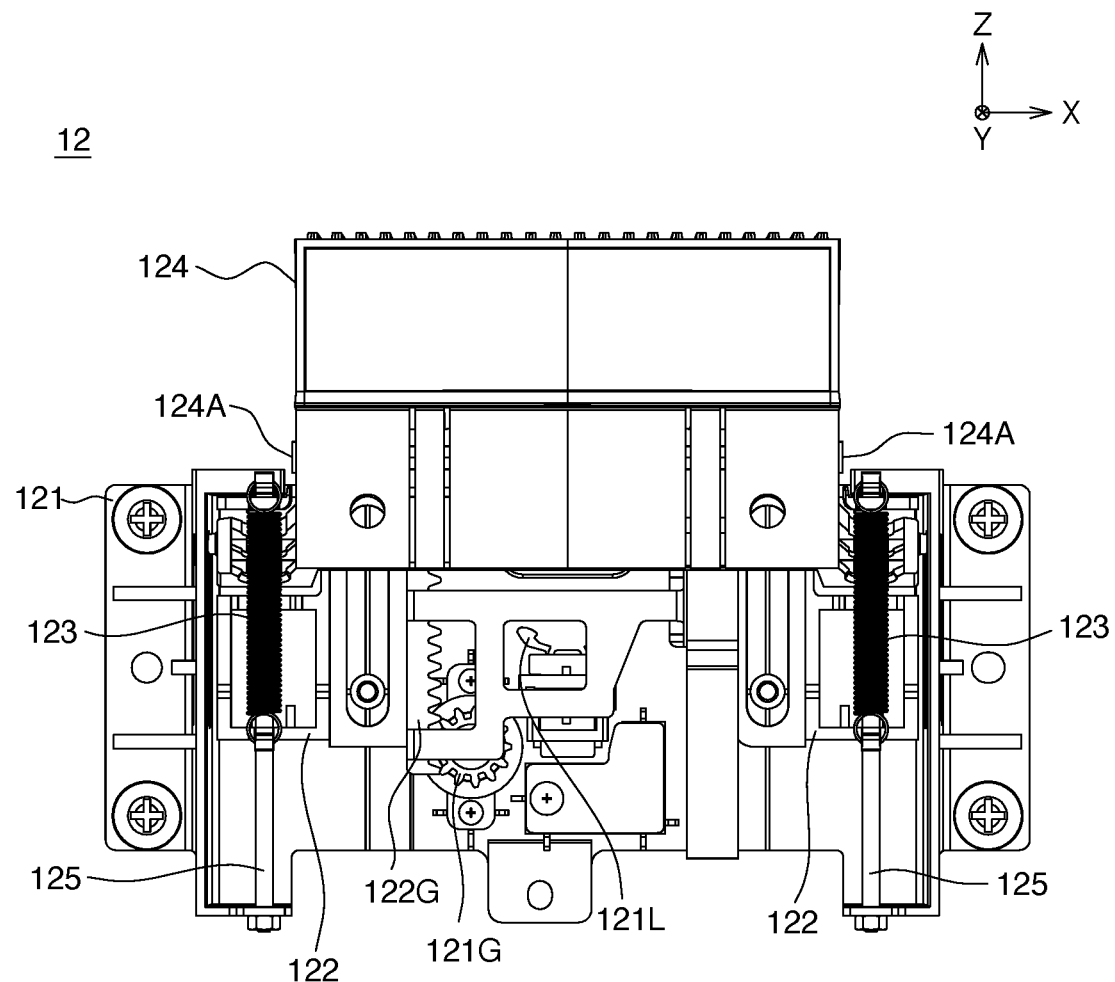
FIG. 5 is a rear view of a camera assembly of a display device according to an embodiment of the present invention.
Figure 6:
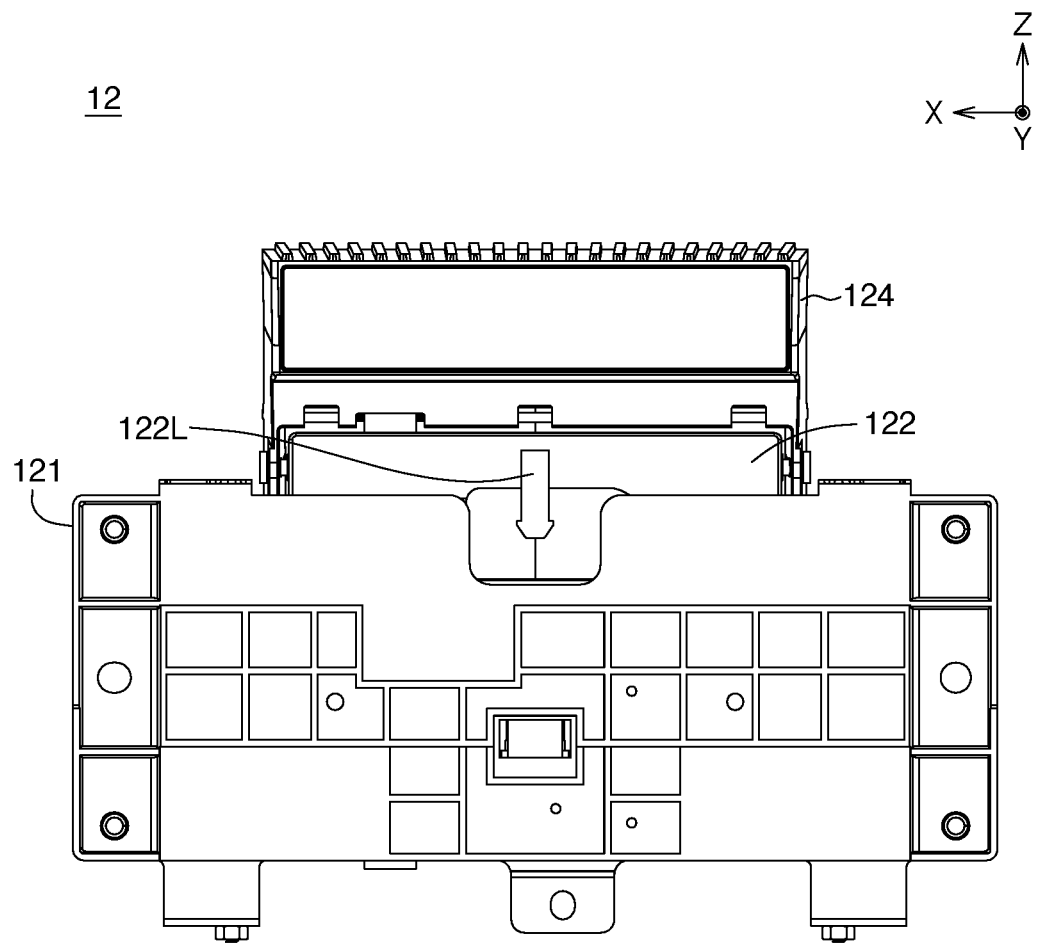
FIG. 6 is a front view of a camera assembly of a display device according to an embodiment of the present invention.
Figure 7:
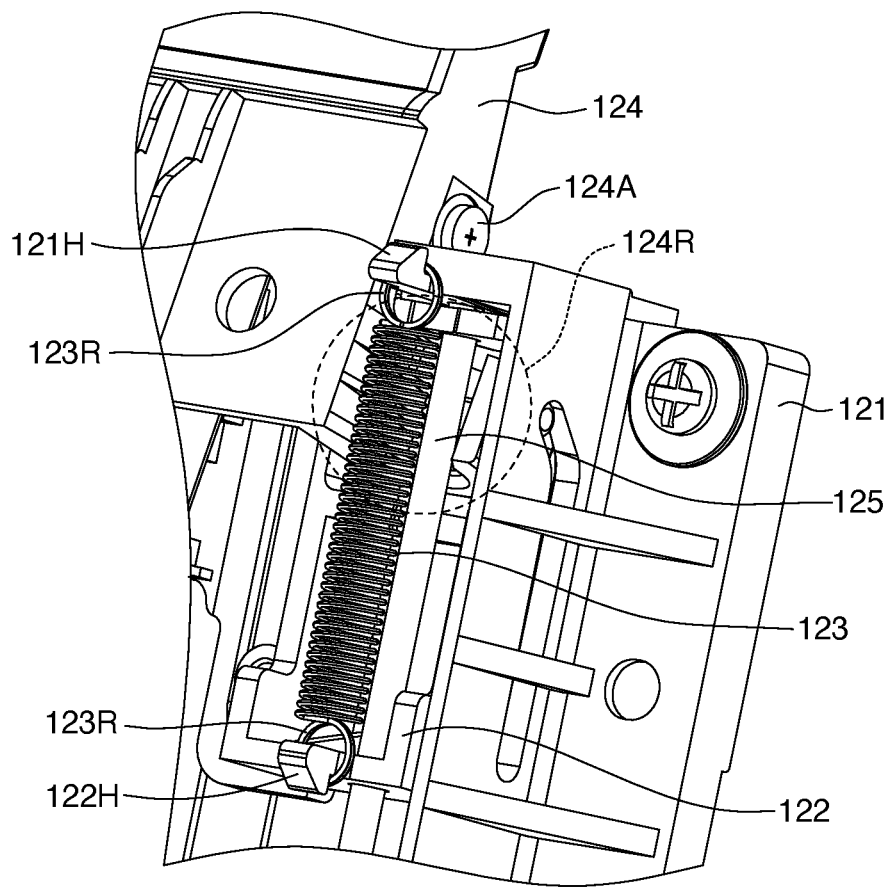
FIG. 7 is a partial enlargement of a camera assembly of a display device according to an embodiment of the present invention.

Refer to FIGS. 5 to 7. FIG. 5 is a rear view of a camera assembly 12 of a display device 10 according to an embodiment of the present invention. FIG. 6 is a front view of a camera assembly 12 of a display device 10 according to an embodiment of the present invention. FIG. 7 is a partial enlargement of a camera assembly 12 of a display device 10 according to an embodiment of the present invention.

As indicated in FIG. 5, the lifting component 122 is connected with the fixed base 121 through a guide rod 125. When the elastic element 123 drives the lifting component 122, the guide rod 125 limits the lifting component 122 to move along an orientation (that is, the Z-axis of FIG. 5). As indicated in FIG. 7, the camera module 124 has a recessed structure 124R, so that the guide rod 125 and the elastic element 123 can pass through an accommodation space formed in the recessed structure 124R. Moreover, during the period when the camera module 124 is pivotally rotated with respect to the lifting component 122, the camera module 124 makes way to the guide rod 125 through the recessed structure 124R (FIG. 7 illustrates the camera module 124 having completed pivoting), so that the camera module 124 will not interfere with the guide rod 125 nor generate collision or abrasion. As indicated in FIG. 5, in the Y-axis direction, that is, the direction parallel to the thickness of the display device 10 (the body 11), the elastic element 123 overlaps the projection of the guide rod 125. The said design can save the dimension of the camera assembly 12 in the X-axis.

As indicated in FIG. 5, the lifting component 122 has a rack structure 122G, and the fixed base 121 is engaged with the rack structure 122G through a damping gear 121G to be connected with the lifting component 122. When the elastic element 123 drives the lifting component 122, the damping gear 121G slows down the movement of the lifting component 122. Then, the slow rising of the lifting component 122 prevents the camera module 124 from popping off the body 11 too fast, not only avoiding parts or elements being collided and damaged if the pop-up speed of the camera module 124 is too fast, but further providing the user with a delicate feeling of the rising speed of the lens.

As indicated in FIG. 6, the lifting component 122 has a buckle structure 122L. When the camera module 124 is received inside the body 11 of the display device 10, the fixed base 121 is buckled with the buckle structure 122L through the latch 121L of FIG. 5 to be connected with the lifting component 122, so that the camera module 124 can be concealed inside the body 11. When the user wants to expose the camera module 124 from the body 11 for use, the user can apply a pressing force on the camera module 124 to unlock the latch 121L and the buckle structure 122L, the latch 121L will release the buckle structure 122L, so that the lifting component 122 can lift the camera module 124.

Figure 8A:
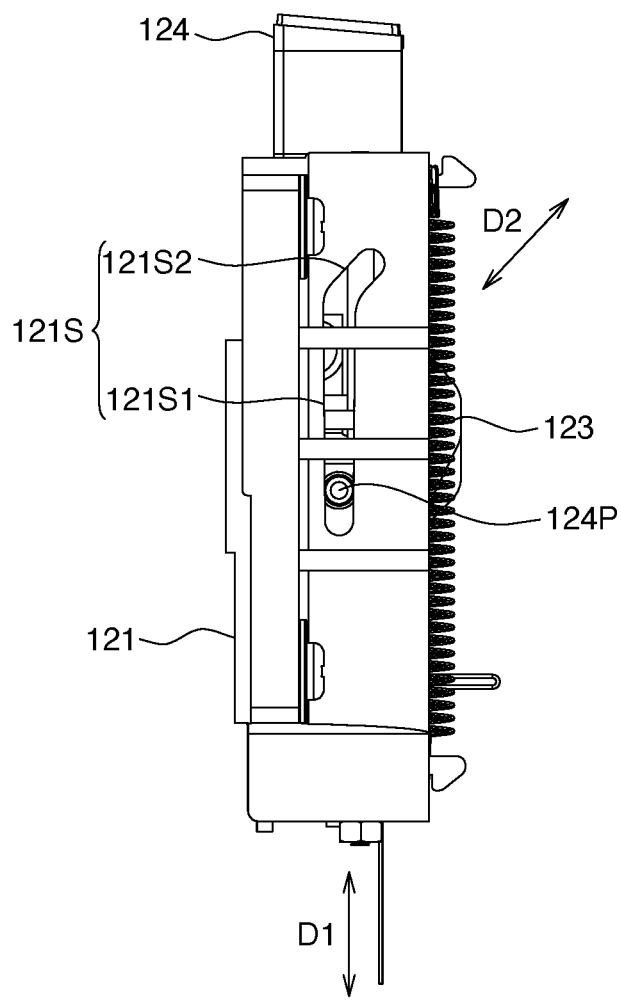
FIGS. 8A to 8C are side views of a camera assembly of a display device according to an embodiment of the present invention.
Figure 8B:
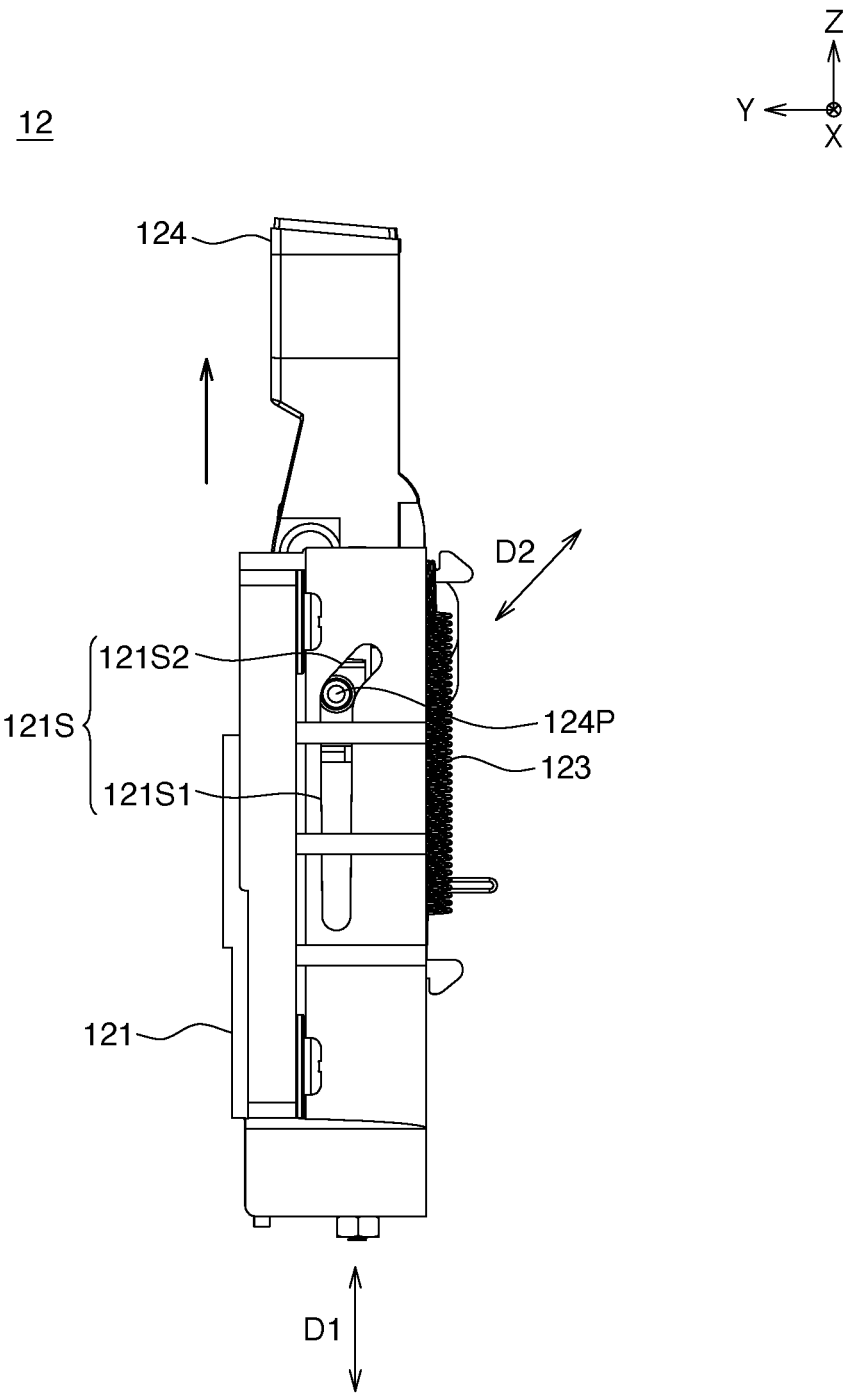
Figure 8C:
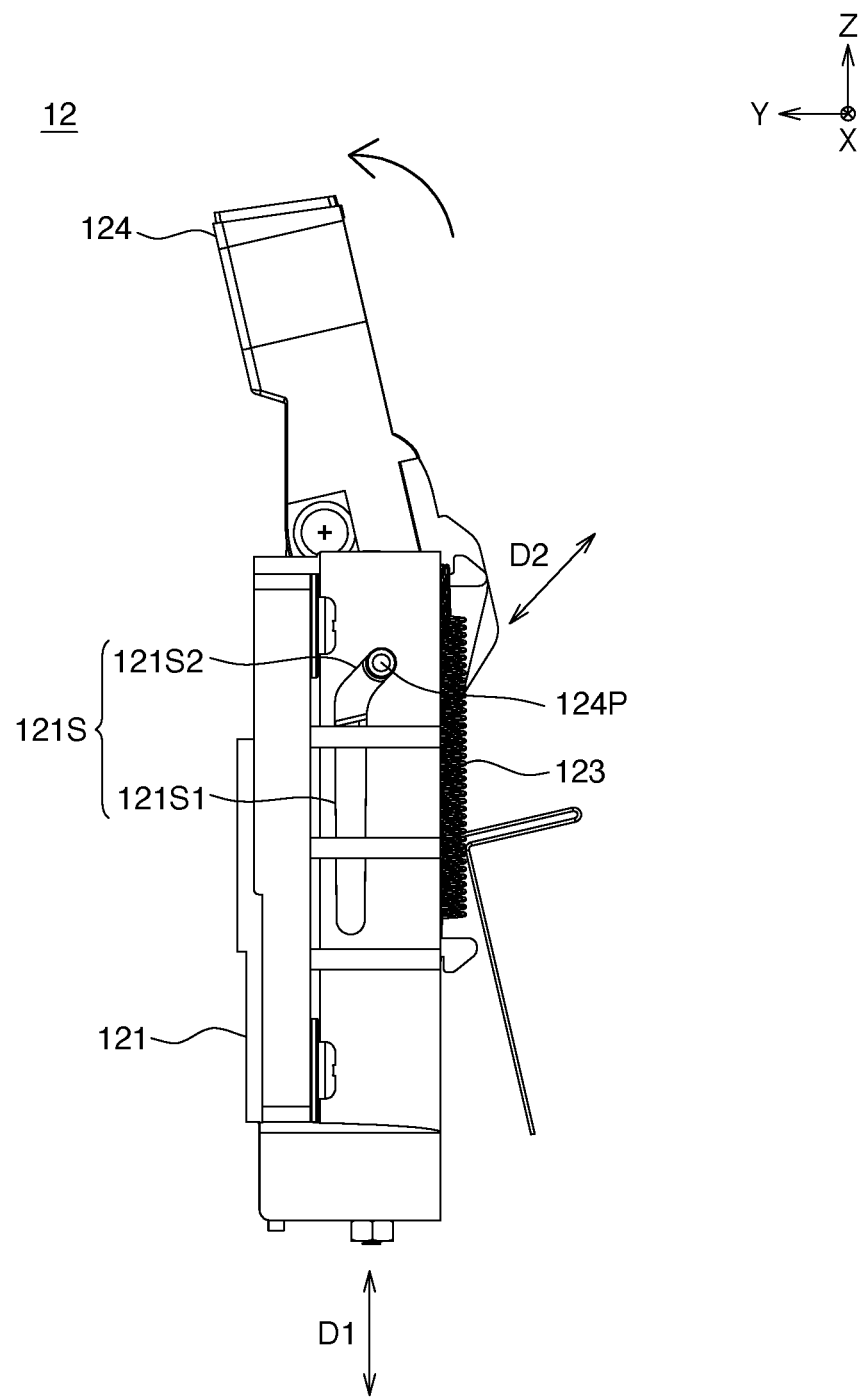

Refer to FIGS. 8A to 8C. FIGS. 8A to 8C are side views of three stages of a camera assembly 12 of a display device 10 according to an embodiment of the present invention.

As indicated in FIGS. 8A to 8C, each of the two sides of the fixed base 121 has a guide groove 121S, each of the two sides of the camera module 124 has a column portion 124P, and during the period when the lifting component 122 lifts the camera module 124, the column portion 124P is in the guide groove 121S and work with the guide groove 121S to perform two directions of upward movement. In the present example, two directions of upward movement includes a first orientation D1 and a second orientation D2, wherein the first orientation D1 is parallel to the display device 10, the second orientation D2 tilts to the first orientation D1. As indicated in FIGS. 8A to 8C, the guide groove 121S includes a first orientation section 121S1 and a second orientation section 121S2, wherein the first orientation section 121S1 is extended along the first orientation D1, the second orientation section 121S2 is connected with an upper end of the first orientation section 121S1, and the second orientation section 121S2 is extended along the second orientation D2.

As indicated in FIG. 8A, the column portion 124P is limited in the first orientation section 121S1 of the guide groove 121S. Meanwhile, the latch 121L and the buckle structure 122L are buckled with each other, therefore the camera module 124 is located at the lowest position relative to the fixed base 121, and the length of the elastic element 123 is the largest stroke. As indicated in FIG. 8B, as the latch 121L and the buckle structure 122L are de-buckled, the elastic element 123 is shortened and provides a restoring force to drive the camera module 124 at the first orientation section 121S1 to raise to the connection between the first orientation section 121S1 and the second orientation section 121S2, so that the column portion 124P touches the inner wall of the guide groove 121S. Meanwhile, the camera module 124 already is exposed from the display device 10.

As indicated in FIG. 8C, since the elastic element 123 is shortened and provides a restoring force to continuously drive the camera module 124, the column portion 124P leans on the inner wall of the guide groove 121S and moves inside the second orientation section 121S2 in an upward and oblique direction until the terminal section of the second orientation section 121S2 is reached. Since the camera module 124 and the lifting component 122 are pivotally connected, and during the period when the column portion 124P moves inside the second orientation section 121S2 in an upward and oblique direction, the camera module 124 is pivotally rotated around the pivot 124A with respect to the lifting component 122 and tilts to the fixed base 121 and the display device 10 as well.

To store the camera module 124 exposed from the display device 10 to the body 11, that is, to restore the camera module 124 to the state of FIG. 8A from the state of FIG. 8C, a pressing force parallel to an orientation of the display device 10 can be applied on the camera module 124 to move the camera module 124 downwards, so that the buckle structure 122L can approach the latch 121L to be buckled thereto. Thus, when storing the camera module 124, the user does not need to align the camera module 124 in the first place. Instead, the user only needs to apply a force parallel to the orientation of the display of the display device 10 (that is, the Z-axis of FIG. 6), and the camera module 124 will be smoothly stored through the guidance of the guide groove 121S.

The present disclosure provides a camera assembly, which can be rotated and moved upwards and downwards. The camera assembly can be disposed in the display device. When not in use, the camera assembly can be concealed inside the display device, so that the display device can maintain an integral appearance. When in use, with a light pressing, the camera assembly can pop up and rotate by an angle. The camera assembly tilts downwards, so that the user can be easily included in the frame and does not have to make further adjustment. During storage, the user does not need to align the camera assembly in the first place. The user only needs to apply a downward pressing force on the camera assembly, and the camera assembly will be smoothly received through the guidance of the guide groove. Also, the design of the present invention can be used in a planar display device as well as a curved display device, and avoids the difficulty encountered in the conventional design of attaching a clamping camera assembly to the display region of a curved display device or a curved display device.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A camera assembly adaptable to a display device, comprising:
   a fixed base having at least one guide groove and disposed in the display device and fixed with the display device, wherein the guide groove comprises a first orientation section and a second orientation section, the first orientation section is extended along a direction parallel to a first orientation of the display device, the second orientation section is connected with an upper end of the first orientation section, and the second orientation section is extended along a second orientation tilting to the first orientation;
   a lifting component movably connected with the fixed base, wherein the lifting component is connected with the fixed base through a guide rod;
   an elastic element connected with the lifting component and the fixed base respectively; and
   a camera module having at least one column portion and pivotally connected with the lifting component;
   wherein, the elastic element provides an elastic force to drive the lifting component to raise the camera module, so that the camera module is exposed from the display device and pivotally rotated with respect to the lifting component and tilts to the display device;
   wherein, during the period when the lifting component lifts the camera module, the column portion cooperates with the guide groove in the guide groove to perform two directions of upward movement;
   wherein, when the camera module is raised, a camera surface of the camera module is non-parallel to a display surface of the display device,
   wherein, in a direction parallel to the thickness of the display device, the elastic element overlaps the guide rod.

2. The camera assembly according to claim 1, wherein when the elastic element drives the lifting component, the guide rod limits the lifting component to move along an orientation.

3. The camera assembly according to claim 2, wherein the camera module has a recessed structure, the guide rod passes through an accommodation space formed in the recessed structure, and during the period when the camera module is pivotally rotated with respect to the lifting component, the camera module makes way to the guide rod through the recessed structure.

4. The camera assembly according to claim 1, wherein the lifting component has a rack structure, and the fixed base is engaged with the rack structure through a damping gear to be connected with the lifting component, when the elastic element drives the lifting component, the damping gear slows down the movement of the lifting component.

5. The camera assembly according to claim 1, wherein the lifting component has a buckle structure, and the fixed base is buckled with the buckle structure through a latch to be connected with the lifting component, when the camera module receives a first pressing force, the latch releases the buckle structure, so that the lifting component lifts the camera module.

6. The camera assembly according to claim 5, wherein when the camera module exposed from the display device receives a second pressing force parallel to a first orientation of the display device, and the camera module is allowed to move downward, so that the buckle structure approaches the latch to be buckled thereto.

7. The camera assembly according to claim 1, wherein the camera module tilts to the display device at an acute angle.

8. A display device, comprising:
   a body; and
   a camera assembly, comprising:
      a fixed base having at least one guide groove and disposed in the body and fixed with the body, wherein the guide groove comprises a first orientation section and a second orientation section, the first orientation section is extended along a direction parallel to a first orientation of the display device, the second orientation section is connected with an upper end of the first orientation section, and the second orientation section is extended along a second orientation tilting to the first orientation;
      a lifting component movably connected with the fixed base, wherein the lifting component is connected with the fixed base through a guide rod;
      an elastic element connected with the lifting component and the fixed base respectively; and
      a camera module having at least one column portion and pivotally connected with the lifting component;
   wherein, the elastic element provides an elastic force to drive the lifting component to raise the camera module, so that the camera module is exposed from the body and pivotally rotated with respect to the lifting component and tilts to the body;
   wherein, during the period when the lifting component lifts the camera module, the column portion cooperates with the guide groove in the guide groove to perform two directions of upward movement;
   wherein, when the camera module is raised, a camera surface of the camera module is non-parallel to a display surface of the display device,
   wherein, in a direction parallel to the thickness of the display device, the elastic element overlaps the guide rod.

9. The display device according to claim 8, wherein when the elastic element drives the lifting component, the guide rod limits the lifting component to move along an orientation.

10. The display device according to claim 9, wherein the camera module has a recessed structure, the guide rod passes through an accommodation space formed in the recessed structure, and during the period when the camera module is pivotally rotated with respect to the lifting component, the camera module makes way to the guide rod through the recessed structure.

11. The display device according to claim 8, wherein the lifting component has a buckle structure, and the fixed base is buckled with the buckle structure through a latch to be connected with the lifting component, when the camera module receives a first pressing force, the latch releases the buckle structure, so that the lifting component lifts the camera module.

12. The display device according to claim 11, wherein when the camera module exposed from the body receives a second pressing force parallel to a first orientation of the display device, the camera module is allowed to move downward, so that the buckle structure approaches the latch to be buckled thereto.

13. The display device according to claim 8, wherein the lifting component has a rack structure, and the fixed base is engaged with the rack structure through a damping gear to be connected with the lifting component, when the elastic module drives the lifting component, the damping gear slows down the movement of the lifting component.

14. The display device according to claim 8, wherein the camera module tilts to the body at an acute angle.

\* \* \* \* \*